US010985687B2

(12) United States Patent
Wu et al.

(10) Patent No.: US 10,985,687 B2
(45) Date of Patent: Apr. 20, 2021

(54) COMMON MODE NOISE CANCELLATION AND DC RIPPLE REDUCTION TECHNIQUES

(71) Applicant: Hamilton Sundstrand Corporation, Charlotte, NC (US)

(72) Inventors: Xin Wu, Glastonbury, CT (US); Lei Xing, South Windsor, CT (US); Jung Muk Choe, Vernon, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/383,139

(22) Filed: Apr. 12, 2019

(65) Prior Publication Data
US 2020/0328713 A1 Oct. 15, 2020

(51) Int. Cl.
| | | |
|---|---|---|
| *H02P 1/26* | (2006.01) | |
| *H02P 27/08* | (2006.01) | |
| *H02K 11/33* | (2016.01) | |
| *H02M 1/14* | (2006.01) | |
| *H02M 7/5387* | (2007.01) | |

(52) U.S. Cl.
CPC .............. *H02P 27/08* (2013.01); *H02K 11/33* (2016.01); *H02M 1/143* (2013.01); *H02M 7/5387* (2013.01)

(58) Field of Classification Search
CPC .......... H02P 29/50; H02P 27/08; H02P 27/06; H02K 11/33; H02M 1/44; H02M 1/43; H02M 7/5387
See application file for complete search history.

(56) References Cited

U.S. PATENT DOCUMENTS

| | | | |
|---|---|---|---|
| 9,641,034 B2 | 5/2017 | Ito et al. | |
| 9,985,566 B2 | 5/2018 | Jiang | |
| 2004/0041534 A1 | 3/2004 | Takahashi | |
| 2008/0179999 A1* | 7/2008 | Nakazawa | B60L 9/32 310/68 D |
| 2010/0072928 A1 | 3/2010 | Welchko | |
| 2013/0044434 A1* | 2/2013 | Sharaf | H02M 7/003 361/702 |
| 2016/0352249 A1 | 12/2016 | Agirman et al. | |
| 2017/0310187 A1* | 10/2017 | Becerra | H02K 9/22 |
| 2019/0047613 A1 | 2/2019 | Kano et al. | |

FOREIGN PATENT DOCUMENTS

WO 2014207858 12/2014

OTHER PUBLICATIONS

Basler Bruno et al., "Reduction of DC Link Capacitor Stress for Double Three-Phase Drive Unit Through Shifted Control and Phase Displacement", 2015 IEEE 11 International Conference on Power Electronics and Drive Systems, Jun. 9, 2015, pp. 887-889.
Zhang Xuning et al., "Impact of Interleaving on Common-Mode EMI Filter Weight Reduction of Paralleled Three-Phase Voltage-Source Converters", 2013 IEEE Energy Conversion Congress and Exposition, Sep. 15, 2013, pp. 1669-1675.
Extended European Search Report dated Jun. 5, 2020, issued during the prosecution of European Patent Application No. EP 19211054.2.

* cited by examiner

*Primary Examiner* — Karen Masih
(74) *Attorney, Agent, or Firm* — Locke Lord LLP; Scott D. Wofsy; Georgi Korobanov

(57) ABSTRACT

A motor drive system including a motor including two three-phase winding sets, wherein each three-phase winding set is connected a respective three-phase three-level inverter.

11 Claims, 3 Drawing Sheets

COMMON MODE NOISE CANCELLATION AND DC RIPPLE REDUCTION TECHNIQUES

BACKGROUND

Technological Field

The present disclosure relates to motor drive systems, and more particularly to reducing common mode noise cancellation and reducing ripple reduction in motor drives.

Description of Related Art

A variety of devices are known in the motor drive art. In typical motor drives, EMI filter and DC link capacitors are designed and sized to meet EMI and power quality standards and requirements. However, these passive components can contribute to over 60% of the total system weight and volume. For more electric and/or hybrid electric propulsion driven aircrafts, reducing the weight of the electrical components is crucial to system integration, as well as to meeting fuel efficiency and performance requirements.

The conventional methods and systems have generally been considered satisfactory for their intended purpose. However, there is still a need in the art for systems and devices having improved noise cancelation and ripple reduction while also being smaller and lighter. There also remains a need in the art for such system and components that are economically viable. The present disclosure may provide a solution for at least one of these remaining challenges.

SUMMARY OF THE INVENTION

A motor drive system includes a motor including two three-phase winding sets, wherein each three-phase winding set is connected a respective three-phase three-level inverter. A common DC link capacitor can be connected to both of the three phase winding sets. A common EMI filter can be connected to both of the three phase winding sets.

Each of the inverters can be phase shifted with respect to each other by 180 degrees. The each of the three-phases of each motor are phase shifted with respect to each other by 60 degrees.

A method of limiting common noise in a motor includes driving DC current from a first set three-phase winding set of a motor to a first inverter and driving DC current from a second three-phase winding set of the motor to a second inverter shifted by 180 degrees with respect to the first three-phase winding set. DC current can be driven from the first inverter to an EMI filter and from the second inverter to the directly to the EMI filter. A falling edge of each of the inverter-switching transients can be identical and a rising edge of each of the inverter-switching transients can be identical.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
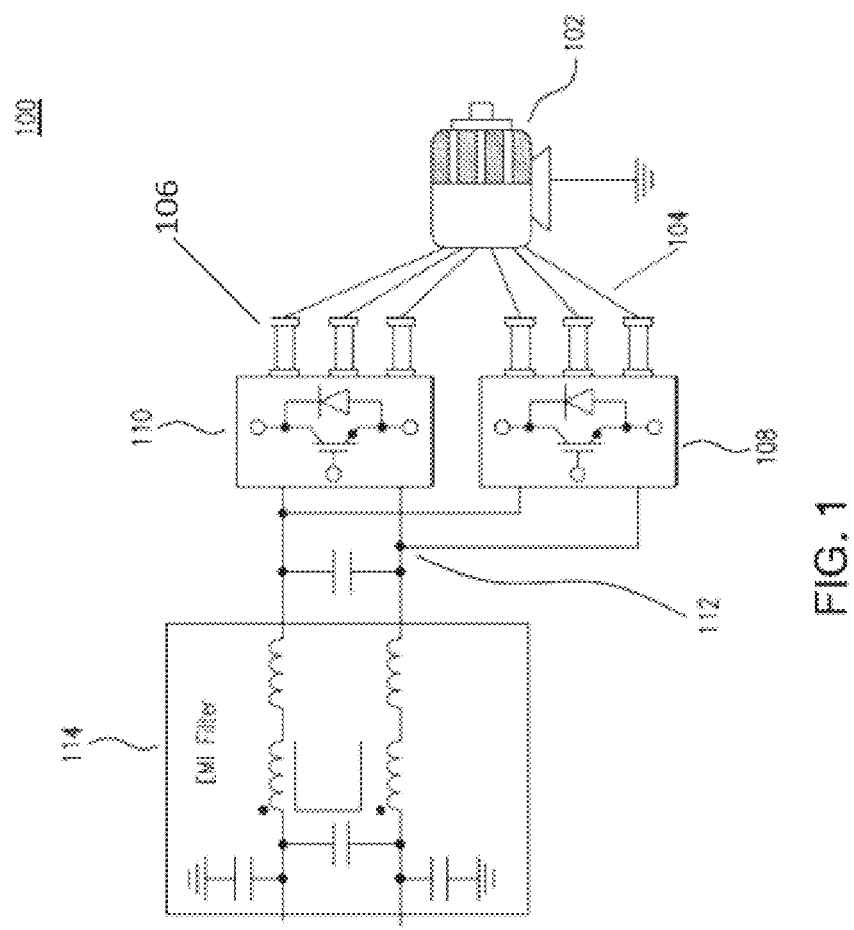
FIG. 1 is a schematic block diagram of a motor drive system.

Reference will now be made to the drawings wherein like reference numerals identify similar structural features or aspects of the subject invention. For purposes of explanation and illustration, and not limitation, a partial view of an exemplary embodiment of a motor drive system in accordance with the invention is shown in FIG. 1 and is designated generally by reference character 100. This disclosure describes techniques to cancel common mode noise and reduce high frequency and low frequency DC ripple current in order minimize the EMI filter and DC link capacitor in a motor controller, and as a result significantly improve the motor drive system power density. The high frequency DC ripple is from the pulse width modulation (PWM) switching ripple, and the low frequency DC ripple is from the third harmonic of the output fundamental frequency.

Figure 2:
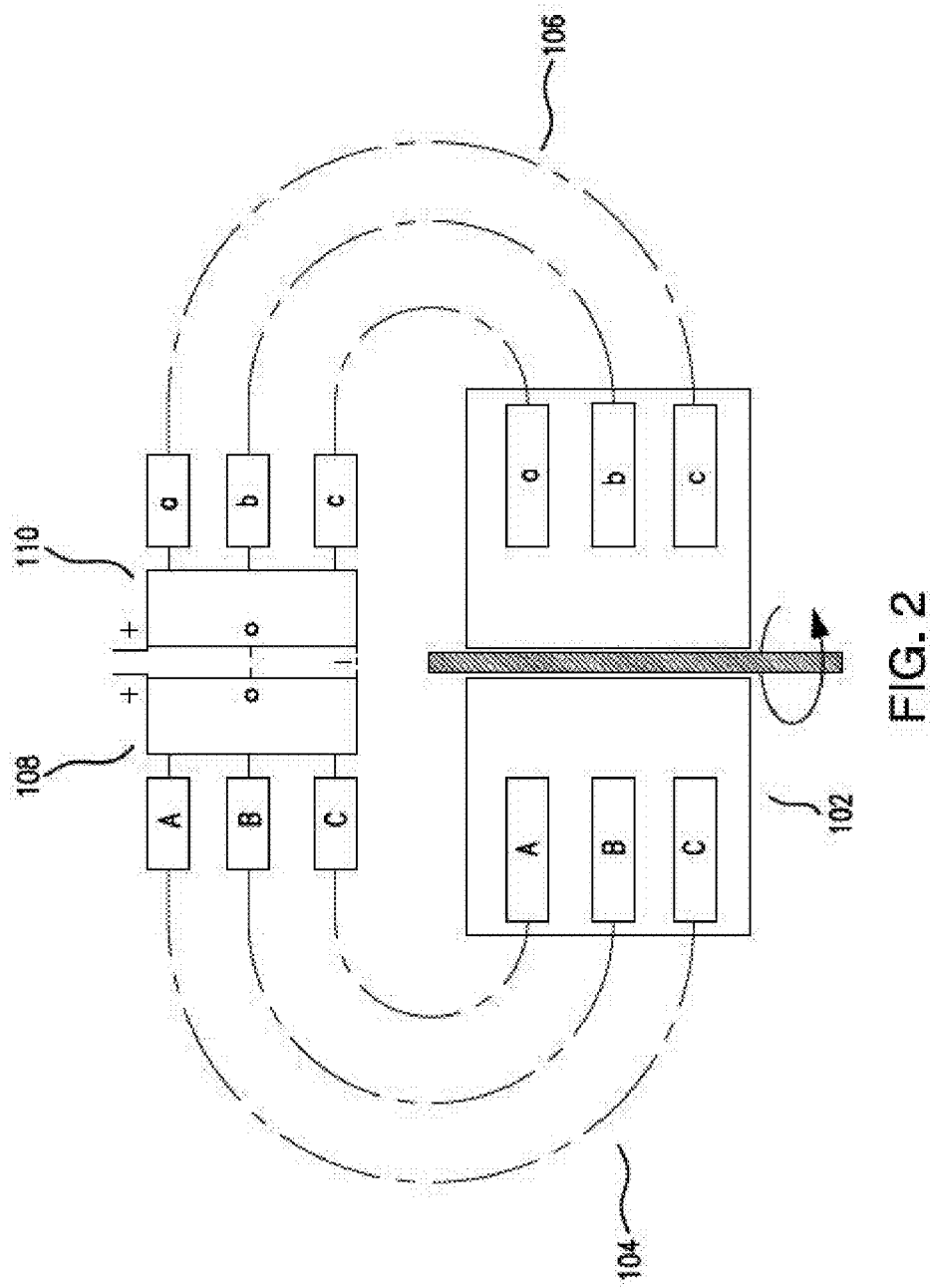
FIG. 2 is a schematic view of a motor FIG. 1, showing a connection to a pair of inverters.

Other aspects of the motor drive system are provided in FIG. 2, as will be described. The methods and systems of the invention can be used to decrease the overall weight of the system and to decrease common mode noise in the motor drive system.

FIG. 1 shows a motor drive system 100 including a motor 102 including two three-phase winding sets 104, 106, wherein each three-phase winding set 104, 106 is connected to a respective three-phase three-level inverter 108, 110. A common DC link capacitor 112 is connected to both of the three-phase winding sets 108, 110. A common EMI filter 114 is connected to both of the three phase winding sets. The outputs of each of the three-level inverters 108, 1108 are connected to the each set of the three-phase windings of the motor 104,106.

The carrier signals used to generate pulse width modulated gate signals for each of the inverters 108, 110 are phase shifted with respect to each other by 180 degrees. The two sets 104, 106 of the three-phases of the motor are phase shifted with respect to each other by 60 degrees electrically (as shown schematically in FIG. 2 ('A' with respect to 'a', 'B' with respect to 'b', 'C' with respect to 'c')). By displacing the two sets of motor windings by 60 degrees electrically, significant amount of common mode noise can be canceled (ideally completely cancelation) and hence minimize the EMI filter; and by shifting the carrier signals of the two inverters by 180 degrees, up to 80% of the high frequency DC current ripple reduction can be realized and reducing the volume of the DC link capacitor by up to 60%.

Figure 3:
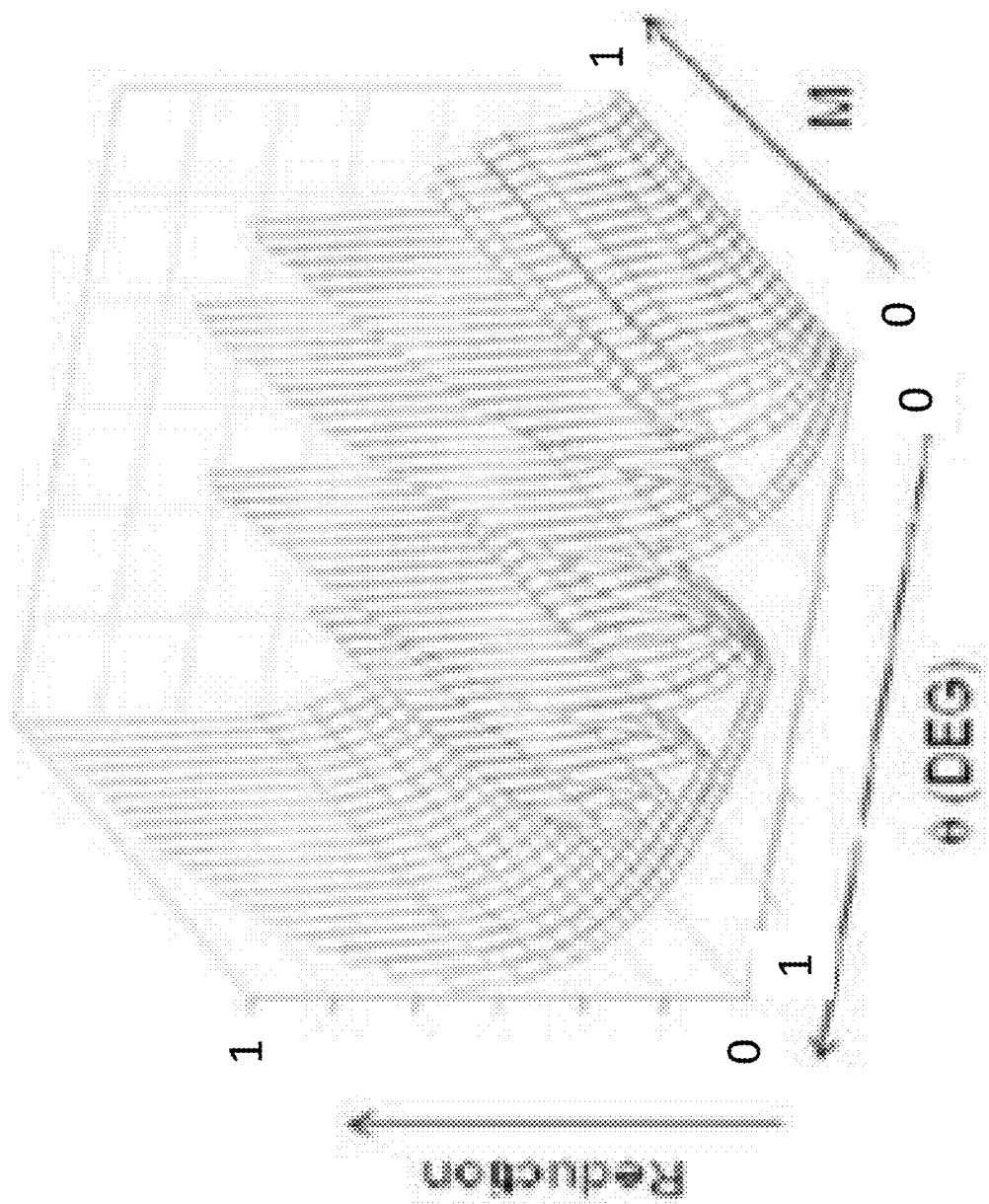
FIG. 3 is a graphical representation of common mode noise reduction at different motor winding phase displacement angles and under different module indexes.

A method of limiting common noise in a motor is also disclosed, the method includes driving AC current from a first set three-phase winding set 104 of a motor 102 to a first inverter 108 and driving AC current from a second three-phase winding set 106 of the motor to a second inverter 110 shifted by 180 degrees with respect to the first three-phase winding set 104. If two sets of three phase motor windings are displaced by 60 degrees electrically, and if the rising and falling edges of the inverter switching transients are identical, then common mode noise can be completely canceled and hence eliminate the need for EMI filter. However there is typically some difference in the rising and falling edges of the semiconductor switching waveforms due to intrinsic device characteristics and external parasitics and component parameter mismatches. As a result complete common mode noise cancelation is typically not realistic, but by displacing the motor winding sets by 60 degrees results in significant noise reduction. FIG. 3 shows the common mode noise reduction at different motor winding phase displacement angles and under different module indexes from circuit analysis with realistic switching transients.

Another passive element that contributes significantly to system weight and volume is the DC link capacitor and the high frequency DC ripple current content is a major sizing factor. By shifting the inverter phases signals by 180 degrees the high frequency DC ripple current can be reduced by up to 80%. A 60% capacitor weight reduction is possible by offsetting the carrier signals to the two sets of inverters by 180 degrees. High frequency components, which are sourced through the DC link capacitors, are significantly reduced with the shift in carrier signals.

The methods and systems of the present disclosure, as described above and shown in the drawings, provide for electrical power system with superior properties including increased reliability and efficiency, and reduced size, weight, complexity, and/or cost. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A motor drive system comprising:
a motor including two three-phase winding sets, wherein each three-phase winding set is connected a respective three-phase three-level inverter;
wherein DC current from a first set three-phase winding set of the motor is driven to a first inverter;
wherein DC current from a second three-phase winding set of the motor is driven to a second inverter which is shifted by 180 degrees with respect to the first three-phase winding set; and
DC current from the first inverter is driven to an EMI filter, wherein a falling edge of each inverter-switching transient is identical.

2. The motor drive system of claim 1, wherein a common DC link capacitor connected to both of the three phase winding sets.

3. The motor drive system of claim 1, wherein a common EMI filter connected to both of the three phase winding sets.

4. The motor drive system of claim 1, wherein each of the inverters are phase shifted with respect to each other.

5. The motor drive system of claim 4, wherein each of the inverters are shifted by 180 degrees with respect to each other.

6. The motor drive system of claim 1, wherein two of the three-phases of each motor are phase shifted with respect to a third phase.

7. The motor drive system of claim 6, wherein two of the three-phases of each motor are shifted by 60 degrees with respect to a third phase.

8. A method of driving limiting common noise in a motor comprising:
driving DC current from a first set three-phase winding set of a motor to a first inverter;
driving DC current from a second three-phase winding set of the motor to a second inverter shifted by 180 degrees with respect to the first three-phase winding set;
driving DC current from the first inverter to an EMI filter, wherein a falling edge of each inverter-switching transient is identical.

9. The method of claim 8, further comprising driving DC current from the second inverter directly to the EMI filter.

10. A method of driving limiting common noise in a motor comprising:
driving DC current from a first set three-phase winding set of a motor to a first inverter;
driving DC current from a second three-phase winding set of the motor to a second inverter shifted by 180 degrees with respect to the first three-phase winding set;
driving DC current from the first inverter to an EMI filter, wherein a rising edge of each inverter-switching transients is identical.

11. A motor drive system comprising:
a motor including two three-phase winding sets, wherein each three-phase winding set is connected a respective three-phase three-level inverter;
wherein DC current from a first set three-phase winding set of the motor is driven to a first inverter;
wherein DC current from a second three-phase winding set of the motor is driven to a second inverter which is shifted by 180 degrees with respect to the first three-phase winding set; and
DC current from the first inverter is driven to an EMI filter, wherein a rising edge of each inverter-switching transient is identical.

* * * * *